US012617628B2

(12) United States Patent
Wang et al.

(10) Patent No.: US 12,617,628 B2
(45) Date of Patent: May 5, 2026

(54) CONTROL SYSTEM FOR CONVEYING LINE, CONVEYING LINE AND CONTROL METHOD

(71) Applicant: Delta Electronics (Shanghai) Co., Ltd., Shanghai (CN)

(72) Inventors: Cheng Wang, Shanghai (CN); Yuqin Tang, Shanghai (CN); Chao Lu, Shanghai (CN); Ruiting Xiong, Shanghai (CN); Xiong Zhang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 1198 days.

(21) Appl. No.: 17/456,561

(22) Filed: Nov. 24, 2021

(65) Prior Publication Data

US 2022/0185590 A1      Jun. 16, 2022

(30) Foreign Application Priority Data

Dec. 14, 2020    (CN) .......................... 202011467060.6

(51) Int. Cl.
| | |
|---|---|
| *B65G 43/00* | (2006.01) |
| *B65G 35/06* | (2006.01) |
| *B65G 43/08* | (2006.01) |

(52) U.S. Cl.
CPC ............. *B65G 43/00* (2013.01); *B65G 35/06* (2013.01); *B65G 43/08* (2013.01);
(Continued)

(58) Field of Classification Search
CPC ......... B65G 43/08; B65G 43/00; B65G 35/06
(Continued)

(56) References Cited

U.S. PATENT DOCUMENTS

| | | | | |
|---|---|---|---|---|
| 4,435,752 | A | | 3/1984 | Winkelman |
| 4,766,547 | A | * | 8/1988 | Modery ................ B61L 23/005 |
| | | | | 700/229 |

(Continued)

FOREIGN PATENT DOCUMENTS

| | | | |
|---|---|---|---|
| CN | 2428777 | Y | 5/2001 |
| CN | 203359591 | U | 12/2013 |

(Continued)

OTHER PUBLICATIONS

Corresponding Taiwan Office Action issued on Jan. 9, 2023 with its translation.

(Continued)

*Primary Examiner* — James R Bidwell
(74) *Attorney, Agent, or Firm* — CKC & Partners Co., LLC

(57) ABSTRACT

The embodiments of the present application provide a control system for a conveying line, a conveying line and a control method for a conveying line, the conveying line includes at least one conveying unit, the control system includes: at least one unit controller, a general controller and an upper computer, the unit controller one-to-one corresponds to the conveying unit, the unit controller is fixed in the corresponding conveying unit, the upper computer generates conveying path data according to a material conveying requirement and layout data of the conveying unit, the general controller is configured to receive the conveying path data, and is further configured to receive material location data sent by the unit controller and generate a control instruction for the unit controller according to the material location data and the conveying path data, and the unit controller controls the conveying unit according to the control instruction.

15 Claims, 9 Drawing Sheets

(52) U.S. Cl.
  CPC ................ *B65G 2201/0258* (2013.01); *B65G*
        *2203/0233* (2013.01); *B65G 2203/042*
        (2013.01)

(58) Field of Classification Search
  USPC ........................................................ 198/572
  See application file for complete search history.

(56) References Cited

U.S. PATENT DOCUMENTS

| | | | |
|---|---|---|---|
| 4,845,843 | A | 7/1989 | Babcock |
| 5,186,308 | A | 2/1993 | Munro |
| 6,523,417 | B1 | 2/2003 | Donahue et al. |
| 7,212,113 | B2 * | 5/2007 | Zanovitch ............ G08B 25/085 |
| | | | 340/5.1 |
| 9,733,638 | B2 * | 8/2017 | Ziegler .............. G05B 19/4148 |
| 11,377,304 | B2 * | 7/2022 | Harnesk ................. B65G 47/22 |
| 2002/0185358 | A1 | 12/2002 | Zeitler et al. |
| 2022/0281691 | A1 * | 9/2022 | Suzuki ................... B65G 47/46 |

FOREIGN PATENT DOCUMENTS

| | | | |
|---|---|---|---|
| CN | 103518137 | A | 1/2014 |
| CN | 204751577 | U | 11/2015 |
| CN | 105773144 | A | 7/2016 |
| CN | 205952844 | U | 2/2017 |
| CN | 206010586 | U | 3/2017 |
| CN | 107720163 | A | 2/2018 |
| CN | 108792494 | A | 11/2018 |
| CN | 109368240 | A | 2/2019 |
| CN | 109533844 | A | 3/2019 |
| CN | 209973537 | U | 1/2020 |
| EP | 1807329 | B1 | 5/2008 |
| JP | 2009010243 | A | 1/2009 |
| KR | 20020071318 | A | 9/2002 |
| TW | 201215553 | A | 4/2012 |
| TW | 201404697 | A | 2/2014 |
| WO | WO-03104115 | A1 * | 12/2003 ............. B65G 47/31 |

OTHER PUBLICATIONS

Corresponding office action of CN 202011467060.6 issued on Dec. 25, 2023.
Corresponding office action of CN 202011467079.0 issued on Dec. 25, 2023.
Corresponding China NOA issued on Sep. 24, 2024 with its English translation.
Corresponding Office Action of U.S. Appl. No. 17/456,371 issued on Oct. 11, 2024.

* cited by examiner

CONTROL SYSTEM FOR CONVEYING LINE, CONVEYING LINE AND CONTROL METHOD

CROSS-REFERENCE TO RELATED APPLICATION

This application claims priority to Chinese Patent Application No. 202011467060.6, filed on Dec. 14, 2020, which is hereby incorporated by reference in its entirety.

TECHNICAL FIELD

The present application relates to the field of industrial manufacturing technology, in particular, to a control system for a conveying line, a conveying line and a control method.

BACKGROUND

In the mass production of products, the traditional customized conveying line can effectively improve production efficiency at the expense of limited costs. However, as the industrial manufacturing changes from large quantities and standardization productions to small quantities and diversified personalized productions, in view of manufacturing cost of highly customized conveying lines for specific usage scenarios and time cost of design, transformation and debugging and maintenance have increased, the traditional conveying lines cannot adapt to use requirements and development trends of flexible layout of the conveying lines and dynamic adjustment of conveying function.

Traditional customized conveying line manufacturers only provide conveying modules with different functions, such as: linear conveying modules, arc conveying modules, 45-degree shunt modules. This type of conveying modules include a motor and pulley sets, where the pulley sets need to be designed according to the needs of a drive mechanism. The programmable logic controller (Programmable Logic Controller, PLC) can control the start and stop, the direction of rotation, and the acceleration and deceleration of the motor. When the conveying tasks of a specific function, for example, shunting and merging, reversing or buffering functions, etc. is to be realized, it is necessary to make shunt modules or reverse modules according to the demands, and it is necessary to write a fixed logic control program on the corresponding PLC. Therefore, if functions of the conveying lines need to be changed and adjusted, it is necessary to re-plan functions of the conveying module and rewrite the control logic program of the PLC, which leads to too long adjustment time of production lines, thereby affecting normal production and high adjustment costs.

SUMMARY

The embodiments of the present application provide a control system for a conveying line, a conveying line and a control method, to solve the problems of the prior art that the functions of the conveying modules need to be re-planned and the logic program needs to be rewritten due to changes in the functional requirements of the conveying lines, resulting in long adjustment time and high adjustment cost.

In a first aspect, an embodiment of the present application provides a control system for a conveying line, the conveying line includes at least one conveying unit, and the control system includes: at least one unit controller, a general controller and an upper computer;

the unit controller one-to-one corresponds to the conveying unit, the unit controller is fixed in the corresponding conveying unit, the general controller is in communication with the unit controller, and the general controller is in communication with the upper computer;

the upper computer is configured to generate conveying path data according to a material conveying requirement and layout data of the conveying unit;

the general controller is configured to receive the conveying path data, and is further configured to receive material location data sent by the unit controller and generate a control instruction for the unit controller according to the material location data and the conveying path data; and the unit controller controls the conveying unit according to the control instruction to convey a material according to a preset conveying path.

Optionally, the general controller and the upper computer are independent devices, or the general controller and the upper computer are integrated into one device.

Optionally, the conveying unit includes a sensor and an actuator;

an input port of the unit controller is configured to electrically connect with the sensor, an output port of the unit controller is configured to electrically connect with the actuator;

the upper computer generates interface configuration information according to an electrical connection between the sensor and the unit controller and an electrical connection between the actuator and the unit controller;

the general controller generates an interface configuration instruction, an interface query instruction and an interface control instruction according to the interface configuration information;

where the interface configuration instruction is configured to configure an interface parameter of the input port of the unit controller and an interface parameter of the output port of the unit controller, the interface query instruction is configured to query interface status information of the input port of the unit controller, and the interface control instruction is configured to control the actuator connected with the output port of the unit controller.

Optionally, the unit controller includes an analog signal input interface circuit and a digital signal input interface circuit;

if there is an electrical connection between the analog signal input interface circuit and the sensor, the upper computer generates interface configuration information for configuring the analog signal input interface circuit; or if there is an electrical connection between the digital signal input interface circuit and the sensor, the upper computer generates interface configuration information for configuring the digital signal input interface circuit; or if there is an electrical connection between the analog signal input interface circuit and the sensor and there is an electrical connection between the digital signal input interface circuit and the sensor, the upper computer generates interface configuration information for configuring the digital signal input interface circuit and the analog signal input interface circuit.

Optionally, the unit controller further includes an analog signal output interface circuit and an digital signal output interface circuit;

if there is an electrical connection between the analog signal output interface circuit and the actuator, the upper computer generates interface configuration information for configuring the analog signal output interface circuit; or if there is an electrical connection between the digital signal output interface circuit and the actuator, the upper computer generates interface configuration information for configuring the digital signal output interface circuit; or if there is an electrical connection between the analog signal output interface circuit and the actuator and there is an electrical connection between the digital signal output interface circuit and the actuator, the upper computer generates interface configuration information for configuring the digital signal output interface circuit and the analog signal output interface circuit.

Optionally, the unit controller further includes a unit processor and a unit communication circuit;

the unit communication circuit is configured to upload the material location data received by the analog signal input interface circuit and/or the digital signal input interface circuit to the general controller, and is further configured to receive the control instruction sent by the general controller; and the unit processor is configured to convert the control instruction into a control signal for controlling the actuator, and transmit the control signal to the actuator through the analog signal output interface circuit and/or the digital signal output interface circuit.

Optionally, the general controller includes a general processor and a general communication circuit;

the general communication circuit is configured to receive the material location data sent by the unit communication circuit, and is further configured to receive the conveying path data sent by the upper computer; and the general processor is configured to generate a control instruction for the unit controller according to the material location data and the conveying path data.

Optionally, the unit controller is configured to receive a fault data of the conveying unit and send the fault data to the general controller;

the general controller is configured to send the fault data to the upper computer; and the upper computer is configured to update the conveying path data according to the fault data.

In a second aspect, an embodiment of the present application provides a conveying line, including the control system, involved in the first aspect and the optional solution, and at least one conveying unit, and the control system is configured to control the at least one conveying unit to convey a material according to a preset conveying path.

In a third aspect, an embodiment of the present application provides a control method for a conveying line, the control method is applied to a general controller, the conveying line includes at least one conveying unit, and control method includes:

receiving a conveying path data sent by an upper computer, where the conveying path data is generated according to a material conveying requirement and layout data of the conveying unit;

receiving material location data sent by a unit controller, where the unit controller one-to-one corresponds to the conveying unit, and the unit controller is fixed in the corresponding conveying unit;

generating a control instruction for the unit controller according to the material location data and the conveying path data; and sending the control instruction to the unit controller, so that the unit controller controls the conveying unit according to the control instruction to convey a material according to a preset conveying path.

Optionally, the conveying unit includes a sensor and an actuator, and the control method further includes:

receiving interface configuration information sent by the upper computer; where the interface configuration information is generated according to an electrical connection mode between the sensor and the unit controller and an electrical connection mode between the actuator and the unit controller; and generating an interface configuration instruction, an interface query instruction and an interface control instruction according to the interface configuration information; where the interface configuration instruction is configured to configure an interface parameter of an input port of the unit controller and an interface parameter of an output port of the unit controller, the interface query instruction is configured to query interface status information of the input port of the unit controller, and the interface control instruction is configured to control the actuator connected with the output port of the unit controller.

In a fourth aspect, an embodiment of the present application provides a control method for a conveying line, where the control method is applied to an upper computer, the conveying line includes at least one conveying unit, and the control method includes:

obtaining a material conveying requirement and layout data of the conveying unit;

generating conveying path data according to the material conveying requirement and the layout data of the conveying unit; and sending the conveying path data to a general controller;

where the conveying path data is configured to generates a control instruction for a unit controller, the control instruction is configured to control the conveying unit to convey a material according to a preset conveying path, where the unit controller one-to-one corresponds to the conveying unit, and the unit controller is fixed in the corresponding conveying unit.

Optionally, the conveying unit includes a sensor and an actuator, and the control method further includes:

generating interface configuration information according to an electrical connection mode between the sensor and the unit controller and an electrical connection mode between the actuator and the unit controller; and sending the interface configuration information to the general controller, so that the general controller generates an interface configuration instruction, an interface query instruction and an interface control instruction according to the interface configuration information.

Optionally, the unit controller includes an analog signal input interface circuit and a digital signal input interface circuit;

the generating interface configuration information according to electrical connection mode between the sensor and the unit controller specifically includes:

if there is an electrical connection between the analog signal input interface circuit and the sensor, generating interface configuration information for configuring the analog signal input interface circuit; or if there is an electrical connection between the digital signal input interface circuit and the sensor, generating interface configuration information for configuring the digital signal input interface circuit; or if there is an electrical connection between the analog signal input interface circuit and the sensor and there is an electrical connection between the digital signal input interface circuit and the sensor, generating interface configuration information for configuring the digital signal input interface circuit and the analog signal input interface circuit.

Optionally, the unit controller includes an analog signal output interface circuit and a digital signal output interface circuit; the generating interface configuration information according to electrical connection mode between the actuator and the unit controller specifically includes:

if there is an electrical connection between the analog signal output interface circuit and the actuator, generating interface configuration information for configuring the analog signal output interface circuit; or if there is an electrical connection between the digital signal output interface circuit and the actuator, generating interface configuration information for configuring the digital signal output interface circuit; or if there is an electrical connection between the analog signal output interface circuit and the actuator and there is an electrical connection between the digital signal output interface circuit and the actuator, generating interface configuration information for configuring the digital signal output interface circuit and the analog signal output interface circuit.

Optionally, the control method further includes:

receiving fault data of a conveying unit sent by the general controller, where the fault data is collected by a sensor; and updating the conveying path data according to the fault data.

In a fifth aspect, an embodiment of the present application provides a control method for a conveying line, where the control method is applied to a unit controller, the conveying line includes at least one conveying unit, the unit controller one-to-one corresponds to the conveying unit, the unit controller is fixed in the corresponding conveying unit, and the control method includes:

sending material location data, so that a general controller generates a control instruction according to the material location data and conveying path data which is generated by an upper computer according to a material conveying requirement and layout data of the conveying unit; and controlling the conveying unit according to the control instruction to convey a material according to a preset conveying path.

Optionally, the general controller and the upper computer are independent devices, or the general controller and the upper computer are integrated into one device.

The embodiments of the present application provide the control system for the conveying line, the conveying line and the control method, the control system includes at least one unit controller, the general controller and the upper computer, the unit controller one-to-one corresponds to the conveying unit, the unit controller is fixed in the corresponding conveying unit, the general controller is in communication with the unit controller and the upper computer, the upper computer generates the conveying path data according to the material conveying requirement and the layout data of the conveying unit, so that the general controller generates the control instruction according to the conveying path data and the material location data, and the unit controller controls the conveying unit to convey the material according to the preset conveying path, which can adapt to various conveying requirements of the material without rewriting and downloading programs for the general controller and the unit controller and realize flexible material conveying without changing the layout of the conveying unit.

In addition, when the actuator or the sensor in the conveying unit needs to be changed or added, there is no need to modify the program in the unit controller, only the upper computer needs to generate the interface configuration information according to the electrical connection relationship between the unit controller and the sensor and/or the electrical connection relationship between the unit controller and the actuator, and update the interface configuration information to the general controller to configure the interface between the unit controller and the sensor and/or the interface between the unit control and the actuator. In addition, the upper computer can update a conveying path of the material according to the fault data, which can respond to the failure of the conveying unit and improve the reliability of the conveying line.

DETAILED DESCRIPTION OF EMBODIMENTS

In order to make the purpose, technical solutions and advantages of the present application clearer, the technical solutions in the present application will be clearly and completely described below in conjunction with the drawings in the present application. Obviously, the described embodiments are part of the embodiments of the present application, rather than all of the embodiments. Based on the embodiments in the present application, all other embodiments obtained by those skilled in the art are within the protection scopes of the present application without creative work.

In order to solve the above-mentioned problems in the prior art, the embodiments of the present application provide a control system for a conveying line, a conveying line with the control system and a control method for a conveying line, the control system for the conveying line includes an upper computer, a general controller and at least one unit controller, the unit controller one-to-one corresponds to a conveying unit in the conveying line, and the unit controller is fixed in the corresponding conveying unit. The general controller is in communication with the unit controller, the general controller is in communication with the upper computer. The communication network composed of the upper computer, the general controller and the unit controller realizes the control of the conveying functions of multiple conveying units, such as translation, jacking, caching and other functions. When a planning of a conveying path changes, there is no need to modify a program of an existing conveying unit, only a material conveying requirement in the upper computer needs to be modified, so that a remote configuration of a function of the conveying unit can be realized through the general controller and the unit controller. In addition, this solution can realize the flexible configuration of a connection interface between the unit controller and a sensor and a connection interface between the unit controller and an actuator, which can adapt to the changes and adjustments of functions of the conveying line, adapts to flexible production scenarios, and meets the functional requirements of conveying line in the field of industrial intelligent manufacturing.

An embodiment of the present application provides a control system for a conveying line, where the conveying line includes a control system and at least one conveying unit 20. Among them, the conveying unit 20 is arranged between the respective stations, and the control system is used to control at least one conveying unit 20 to convey a material according to a preset conveying path, so as to realize the material conveying from one station to another station.

Figure 1:
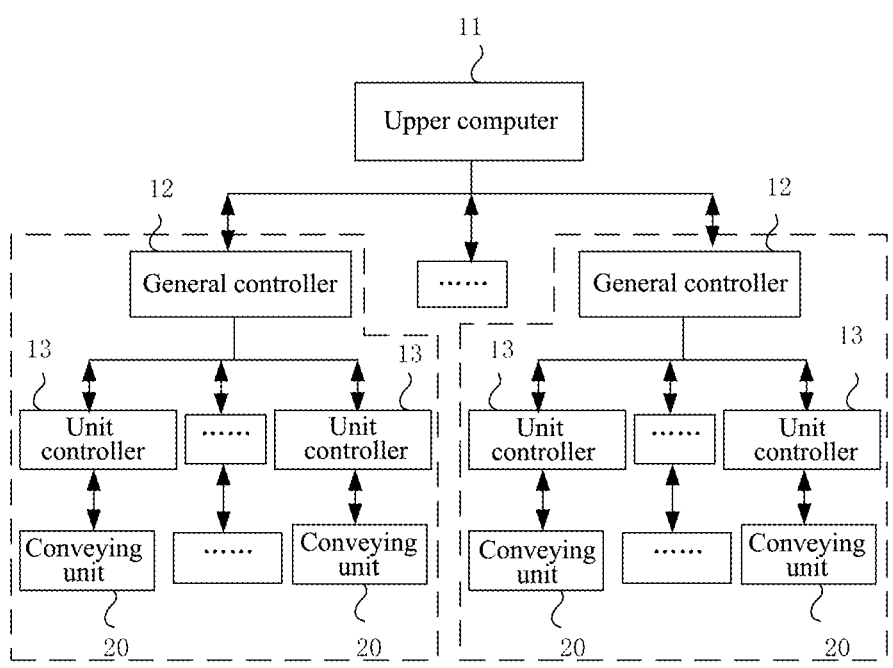
FIG. 1 is a schematic structural diagram of a control system for a conveying line provided by an embodiment of the present application.

As shown in FIG. 1, the control system for the conveying line provided by the embodiment of the present application includes at least one unit controller 13, a general controller 12, and an upper computer 11.

Among them, the unit controller 13 one-to-one corresponds to the conveying unit 20, that is, one conveying unit 20 is equipped with one unit controller 13, and the two together form a functional module that integrates control and electrical and mechanism. The unit controller 13 is fixed in the corresponding conveying unit 20. The unit controller 13 can be installed on the bottom or both sides of the conveying unit 20, which is no limited herein.

The general controller 12 is in communication with the unit controller 13, and the general controller 12 is in communication with the upper computer 11.

The upper computer 11 first obtains a material conveying requirement and layout data of the conveying unit. Among them, the material conveying requirement includes a starting station, a medium station and an end station of a material transportation. The layout data of the conveying unit includes the relative positional relationships between the respective conveying unit and the station.

Then, the upper computer 11 generates conveying path data according to the material conveying requirement and the layout data of the conveying unit, and sends the conveying path data to the general controller 12. Among them, the conveying path data specifically includes the conveying unit required for completing the material conveying requirement and a work sequence between the respective conveying units.

The general controller 12 receives the conveying path data from the upper computer 11, and further receives material location data from the unit controller 13. Among them, the material location data refers to the current location of the material.

After general controller obtaining the conveying path data and the material location data, the general controller 12 generates a control instruction for the unit controller according to the material location data and the conveying path data, and sends the control instruction to the corresponding unit controller 13.

The unit controller 13 controls the conveying unit 20 according to the control instruction to convey a material according to the preset conveying path after receiving the control instruction.

In the control system for the conveying line provided by the embodiments of the present application, when the material processing process is changed due to process changes and the route of the conveying line needs to be changed to adapt to the changed processing process, the material conveying requirement and the layout data of the conveying unit is entered into the upper computer. The upper computer performs path planning according to the material conveying requirement and the layout data of the conveying unit to obtain the conveying path data, and sends the conveying path data to the general controller. The general controller generates the control instruction for controlling the conveying unit according to the material location data which is stored locally and the conveying path data, and send the control instruction to the corresponding unit controller, and the unit controller parses the control instruction and generates a control signal according to the parsed result. The control signal is used to control the conveying unit to convey a material according to the preset conveying path, so that the conveying line can meet the various conveying requirements of the material and realize flexible material conveying.

In this embodiment, the control system for the conveying line may include an upper computer 11, multiple general controllers 12 and multiple unit controllers 13, each general controller 12 is in communication with multiple unit controllers 13, and each general controller 12 is in communication with the upper computer 11. Among them, the general controllers 12 and the upper computer 11 can be independent devices, that is, the general controllers 12 and the upper computer 11 can be separated in hardware and function. In other embodiments, the control system for the conveying line may include an upper computer 11, a general controller 12, and multiple unit controllers 13, where the general controller 12 and the upper computer 11 can be independent devices; the general controller 12 and the upper computer 11 can also be integrated into one device, that is, the software and hardware of the upper computer and the software and hardware of the general controller are integrated on one device.

Figure 2:
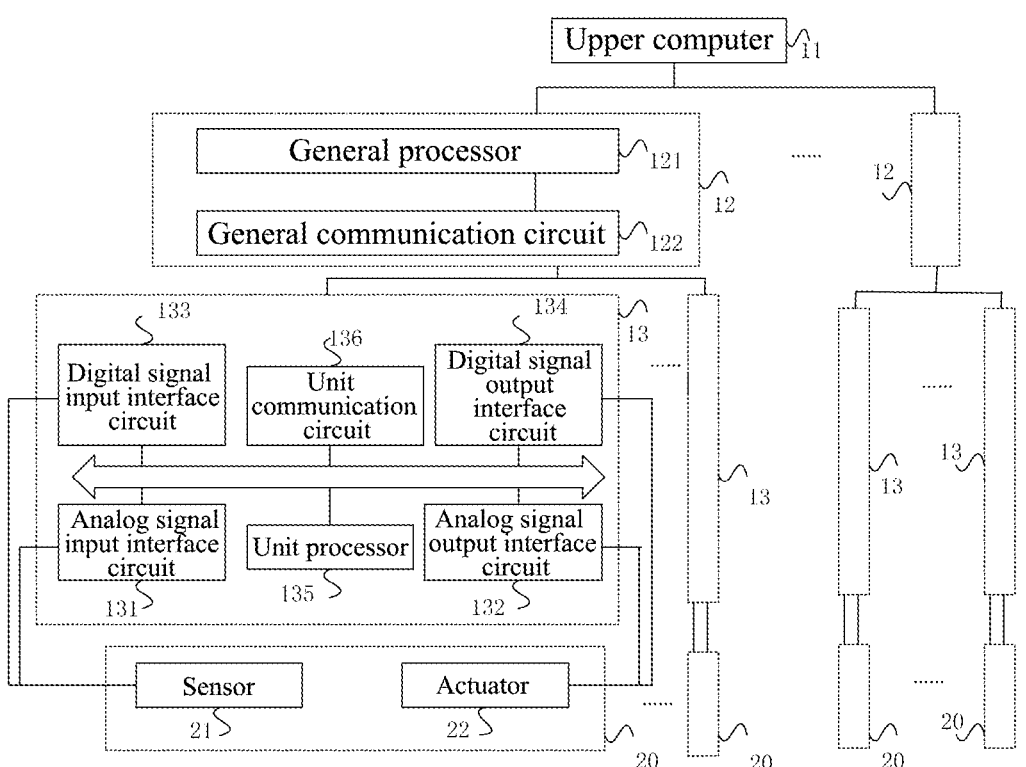
FIG. 2 is a schematic diagram of a specific structure of a control system for a conveying line provided by an embodiment of the present application.

As shown in FIG. 2, in some embodiments, the conveying unit 20 includes a sensor 21 and an actuator 22. The sensor 21 is used to collect location information of a material, and then determine whether the material pass through the conveying unit 20 according to the location information of the material. A logo also can be installed on the material or a material tray that contains the material, so that the sensor 21 can collect attribute information of the material The actuator 22 is used to move the material along a conveying path. The actuator 22 can directly release or block the material tray that contains the material, so that the material is moved along the conveying path. It is also possible to place the material tray that contains the material on a conveying member, and drive the conveying member to move the material along the conveying path. The actuator 22 realizes the movement of the material along the conveying path by completing any one or more functions of linear conveying, reversing translation, lifting, curved conveying, jacking positioning, buffering, rotating, flipping and climbing.

An input port of the unit controller 13 is used to electrical connect with the sensor 21, and an output port of the unit controller 13 is used to electrical connect with the actuator 22.

As one of the implementations, after determining the electrical connection mode between the sensor 21 and the unit controller 13 and the electrical connection mode between the actuator 22 and the unit controller 13, the above electrical connection modes are inputted to the upper computer 11.

The upper computer 11 generates interface configuration information according to the electrical connection mode between the sensor 21 and the unit controller 13, and the electrical connection mode between the actuator 22 and the unit controller 13. The general controller 12 is used to generate an interface configuration instruction, an interface query instruction and an interface control instruction according to the interface configuration information, to complete the configuration of the unit controller 13.

Among them, the interface configuration instruction is used to configure the interface parameter of the input port of the unit controller 13 and the interface parameter of the output port of the unit controller 13, the interface query instruction is used to query the interface status information of the input port of the unit controller 13, and the interface control instruction is used to control the actuator 22 connected with the output port of the unit controller 13.

With continued reference to FIG. 2, in some embodiments, the unit controller 13 includes an analog signal input interface circuit 131, an analog signal output interface circuit 132, a digital signal input interface circuit 133, and a digital signal output interface circuit 134.

If there is an electrical connection between the analog signal input interface circuit 131 and the sensor 21, the upper computer 11 generates the interface configuration information used to configure the analog signal input interface circuit 131, and the general controller 12 generates the interface configuration instruction and the interface query instruction according to the interface configuration information, to complete the interface configuration of the analog signal input interface circuit 131.

If there is an electrical connection between the digital signal input interface circuit 133 and the sensor 21, the upper computer 11 generates the interface configuration information used to configure the digital signal input interface circuit 133, and the general controller 12 generates the interface configuration instruction and the interface query instruction according to the interface configuration information, to complete the interface configuration of the digital signal input interface circuit 133.

If there is an electrical connection between the analog signal input interface circuit 131 and the sensor 21 and there is an electrical connection between the digital signal input interface circuit 133 and the sensor 21, the upper computer 11 generates the interface configuration information used to configure the digital signal input interface circuit 133 and the analog signal input interface circuit 131, to complete the interface configuration of the digital signal input interface circuit 133 and the analog signal input interface circuit 131.

If there is an electrical connection between the analog signal output interface circuit 132 and the actuator 22, the upper computer 11 generates the interface configuration information used to configure the analog signal output interface circuit 132, and the general controller 12 generates the interface configuration instruction, the interface query instruction and the interface control instruction according to the interface configuration information, to complete the interface configuration of the analog signal output interface circuit 132.

If there is an electrical connection between the digital signal output interface circuit 134 and the actuator 22, the upper computer 11 generates the interface configuration information used to configure the digital signal output interface circuit 134, and the general controller 12 generates the interface configuration instruction, the interface query instruction and the interface control instruction according to the interface configuration information, to complete the interface configuration of the digital signal output interface circuit 134.

If there is an electrical connection between the analog signal output interface circuit 132 and the actuator 22 and there is an electrical connection between the digital signal output interface circuit 134 and the actuator 22, the upper computer 11 generates the interface configuration information used to configure the digital signal output interface circuit 134 and the analog signal output interface circuit 132, to complete the interface configuration of the digital signal output interface circuit 134 and the analog signal output interface circuit 132.

After completing the interface configuration in the analog signal input interface circuit 131, the analog signal output interface circuit 132, the digital signal input interface circuit 133, and the digital signal output interface circuit 134 in the unit controller 13, the unit controller 13 obtains the position information collected by the sensor through the analog signal input interface circuit 131 and/or the digital signal input interface circuit 133, and sends the control signal to the actuator 22 through the analog signal output interface circuit 132 and/or the digital signal output interface circuit 134, to control an action of the actuator 22, thereby driving the material to move according to the preset conveying path.

In some embodiments, a sensor for monitoring a working state of a device, for example, for monitoring a working temperature and a noise of the motor of the conveying unit 20, is added to each conveying unit 20 in the conveying line. The unit controller 13 is also used to obtain fault data of the conveying unit 20 and send the fault data to the general controller 12. After general controller 12 receiving the fault data, the general controller 12 forwards the fault data to the upper computer 11. The upper computer 11 updates the conveying path data according to the fault data, bypasses a faulty conveying unit 20, coordinates other stations to perform operations, and restores the original path after the fault of the faulty conveying unit 20 is eliminated.

The upper computer records the received fault data, status data of the sensor, status data of the actuator and the number of data interactions between the general controller and the upper computer, and predicts failures based on the above data, and then generates maintenance prompts based on the predicted failures, for example, replacement of belts, motor lubrication and other prompts, to reduce the incidence of failure.

In the control system for the conveying line provided by the embodiment of the present application, when it is necessary to add a sensor, add an actuator, modify an interface of the sensor or modify an interface of the actuator in the conveying unit, since the unit controller and the corresponding conveying unit are integrated into an integrated functional module, there is no need to modify a program in the unit controller, only the upper computer needs to generate the interface configuration information according to the electrical connection relationship between the unit controller and the sensor and/or the electrical connection relationship between the unit controller and the actuator, and update it to the general controller, to configure the interface between the unit controller and the sensor, as well as the interface between the unit control and the actuator. After completing the configuration of the unit controller, the upper computer can generate the conveying path data according to the material conveying requirement and the layout of the conveying unit, so that the general controller can generate control instructions based on the conveying path and the material location data, and the unit controller can control the conveying unit to convey the material according to the preset path. In addition, the conveying path of the material is updated according to the fault data which can respond to the failure of the conveying unit, thereby improving the reliability of the conveying line.

Figure 3:
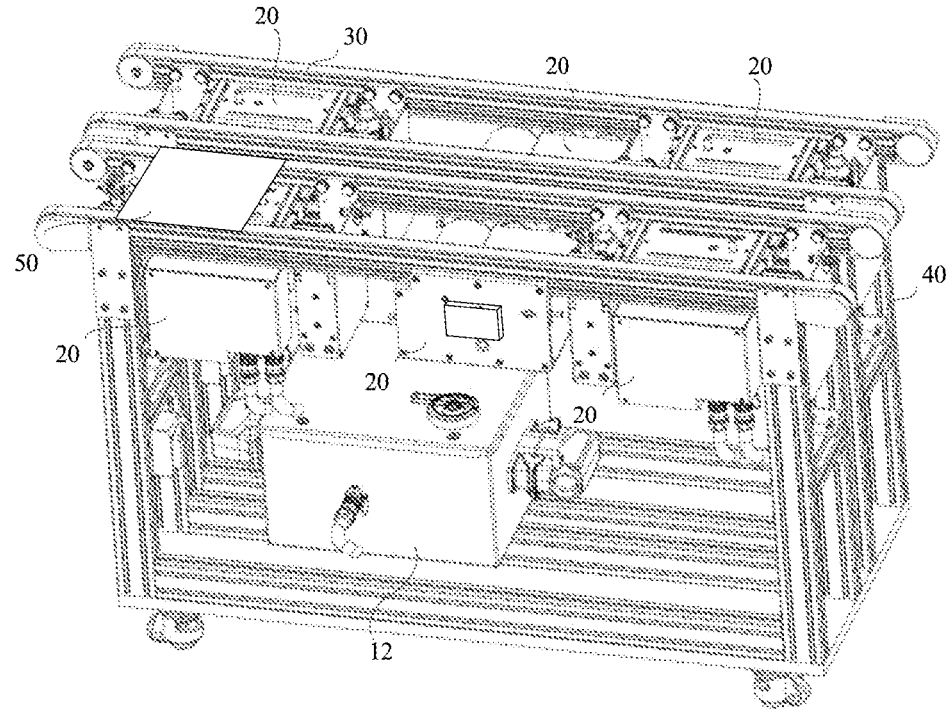
FIG. 3 is a schematic structural diagram of a conveying line provided by an embodiment of the present application.

As shown in FIG. 3, an embodiment of the present application provides a conveying line, and the conveying line includes the control system in the above embodiments and at least one conveying unit 20. The control system is used to control the conveying unit 20 to convey a material according to the preset conveying path.

In practical applications, the conveying line also includes a frame 40, a conveying member 30 and a material tray 50. The conveying unit 20 is arranged on the frame 40, the conveying member 30 is arranged on the frame 40, the conveying member 30 extends along a material conveying direction, and the material tray 50 is placed on a face side of the conveying member 30. It should be noted that the face side of the conveying member 30 is the side of the conveying member 30 away from the inside of the frame 40.

Referring to FIG. 3, in this embodiment, the conveying line includes at least two groups of conveying members 30, and the two groups of conveying members 30 are arranged side by side along a direction perpendicular to the material conveying direction, each group of conveying member 30 forms a transmitting line, and the moving directions of the two groups of conveying members 30 can be opposite. For example, one group of conveying member 30 rotates clockwise, that is, the face side of the conveying member 30 moves toward a right end of the frame 40, and the other group of conveying member 30 rotates counterclockwise, that is, the face side of the conveying member 30 moves toward a left end of the frame 40, and the two groups of conveying member 30 realize the "one go and one return" material conveying loop.

Among them, each group of conveying member 30 may include two conveying belts arranged side by side perpendicular to the material conveying direction, for example, each group of conveying member 30 are two-way double belts, two ends of the material tray 50 are placed in two parallel conveying belts. As the conveying member 30 moves, the material tray 50 also moves in the material conveying direction.

It should be noted that, in this embodiment, the material conveying direction refers to a direction of movement of the material tray 50 in an extending direction of the conveying member 30. In other embodiments, the conveying member 30 may also be a conveying chain, and the embodiment of the present application does not limit the structure of the conveying member 30, as long as the material tray 50 can be conveyed.

Figure 4:
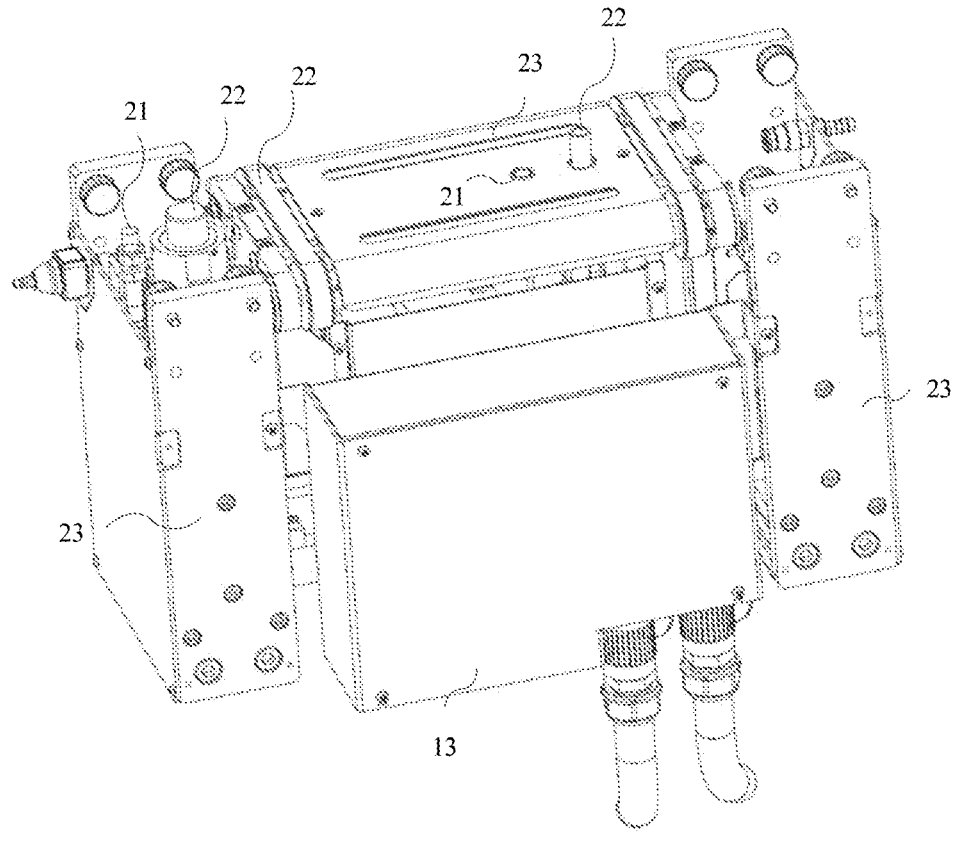
FIG. 4 is a schematic structural diagram of a conveying unit provided by an embodiment of the present application.

In some embodiments, as shown in FIG. 4, the conveying unit 20 includes a sensor 21, an actuator 22, and a mechanism assembly 23. The sensor 21 and the actuator 22 are mounted on the mechanism assembly 23, and the unit controller 13 is mounted on the mechanism assembly 23. In this embodiment, the unit controller 13 can be placed at a bottom of the conveying unit 20, and can be disassembled and moved together with the conveying unit 20. It is also possible to place the unit controller 13 on both sides of the conveying unit 20 according to an actual space of the machine.

The input port of the unit controller 13 is used for electrical connection with the sensor 21, and the output port of the unit controller 13 is used for electrical connection with the actuator 22. Among them, the unit controller 13 can use $I_2C$, SPI, CAN and other bus interfaces to connect to the sensor 21. The sensor 21 collects the position information of the material, and realizes an automatic control of the actuator 22 through the unit controller 13 then to complete an accurate drive of the material tray.

With continued reference to FIG. 2, in some embodiments, the unit controller 13 includes an analog signal input interface circuit 131, an analog signal output interface circuit 132, a digital signal input interface circuit 133, a digital signal output interface circuit 134, a unit processor 135 and a unit communication circuit 136. The unit communication circuit 136 is used to upload material location data received by the analog signal input interface circuit 131 and/or the digital signal input interface circuit 133 to the general controller 12, and is also used to receive a control instruction sent by the general controller 12. The unit processor 135 is used to convert the control instruction into a control signal for controlling the actuator 22, and transmit the control signal to the actuator 22 through the analog signal output interface circuit 132 and/or the digital signal output interface circuit 134.

The general controller 12 includes a general processor 121 and a general communication circuit 122. The general communication circuit 122 is used to receive the material location data sent by the unit communication circuit 136, and also used to receive conveying path data sent by the upper computer 11. The general processor 121 is used to generate the control instruction for the unit controller 13 according to the material location data and the conveying path data.

The analog signal input interface circuit 131 and the digital signal input interface circuit 133 are used as the input port of the unit controller 13 and are connected to the sensor 21 in the conveying unit 20. The analog signal output interface circuit 132 and the digital signal output interface circuit 134 are used as the output port of the unit controller 13, and are connected to the actuator 22 in the conveying unit 20. The unit processor 135 is connected to the other parts of the unit controller 13 via a bus.

The sensor 21 and the actuator 22 in each conveying unit 20 obtain power from the corresponding unit controller 13, and the two unit controllers 13 corresponding to the two adjacent conveying units 20 are connected by a cable. The cable is used for the communication between two unit controllers 13 to form a communication network between the two conveying units 20, and is also used to supply the power to the unit controller 13, the sensor 21 in conveying unit 20 and the actuator 22 in conveying unit 20. The general communication circuit 122 is connected to a certain unit controller 13 in the communication network which controls the conveying unit 20, that is, the information acquisition and control of all the conveying units 20 can be achieved through the communication bus.

The general communication circuit 122 provides a connection interface for communicating with the upper computer 11, and may also provide a connection interface for communicating with the unit communication circuit 136 in each unit controller 13. The general communication circuit 122 includes a wired or wireless bus interface such as an RS485 interface, an Ethernet interface and/or a WIFI interface. The general communication circuit 122 in the general controller 12 communicates with the upper computer 11 through an Ethernet interface or a WIFI interface.

The unit communication circuit 136 includes wired or wireless bus interfaces such as a RS485 interface, a CAN bus and/or an Ethernet interface, the serial Modbus RTU protocol can be run on the RS485 interface, and the Modbus TCP protocol can be run on the Ethernet interface. The unit communication circuit 136 can also include other common industrial network communication interfaces and protocols, such as Profinet, Powerlink, and Ethernet/IP. The unit communication circuit 136 communicates with general communication circuit 122 through communication interfaces such as RS485 interface, CAN bus and/or Ethernet.

The upper computer 11 generates a configuration file containing interface configuration information according to the electrical connection relationship between the sensor 21 of the conveying unit 20 and the unit controller 13, and the electrical connection relationship between the actuator 22 and the unit controller 13. The general communication circuit 122 receives the configuration file containing the interface configuration information sent by the upper computer 11. The interface configuration information is used to configure the analog signal input interface circuit 131, the analog signal output interface circuit 132, the digital signal input interface circuit 133, and the digital signal output interface circuit 134. The interface configuration information is also used to configure a logic function of the conveying unit 20. The configuration file can be in a common standard or custom format An embedded program runs on the general processor 121, and the general processor 121 parses the configuration file and generates an interface instruction according to the configuration file. The interface instruction includes an interface configuration instruction and an interface query instruction which are used to configure an interface of the unit controller, and an interface control instruction which is used to configure the logic function of the conveying unit. The general processor 121 maps the interface configuration instruction, the interface query instruction and the interface control instruction to a register address defined by the corresponding function of the unit controller 13 to implement a configuration of the interface of the unit controller 13 and a configuration of the logic function of the conveying unit 20.

After completing the configuration of the unit controller 13, the upper computer 11 obtains a material conveying requirement and layout data of the conveying unit, and generates conveying path data according to the material conveying requirement and the layout data of the conveying unit. The general communication circuit 122 is used to receive the conveying path data sent by the upper computer 11. The unit communication circuit 136 uploads material location data received by the analog signal input interface circuit 131 and/or digital signal input interface circuit 133 to the general controller 12, and the general communication circuit 122 receives the material location data sent by the unit communication circuit 136. The general processor 121 is used to generate a control instruction for the unit controller according to the material location data and the conveying path data. The general communication circuit 122 receives the control instruction sent by the general processor 121, and sends the control instruction to the respective unit processor 13. The unit processor 13 is used to convert the control instruction into a control signal for controlling the actuator 22, and transmit it to the actuator 22 through the analog signal output interface circuit 132 and/or digital signal output interface circuit 134, to control an action of the actuator 22 in the corresponding conveying unit 20, and then drive the material to move according to the preset conveying path.

The following example illustrates the process of the control system for the conveying line to control the movement of the material along the preset conveying path according to the material conveying requirement.

Figure 5:
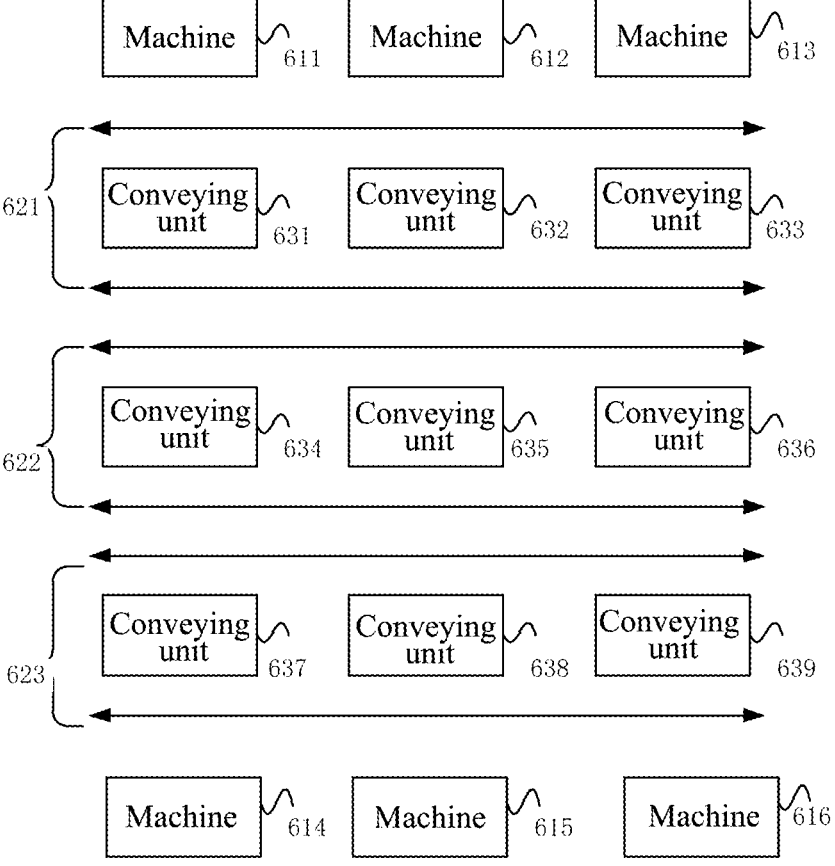
FIG. 5 is a schematic diagram of a layout of a conveying unit in a conveying line provided by an embodiment of the present application.

As shown in FIG. 5, the conveying line includes 9 conveying units and 3 conveying belts, and the 9 conveying units are sequentially numbered as 631, 632, 633, 634, 635, 636, 637, 638 and 639. The 9 conveying units are arranged in a 3×3 matrix. The 3 conveying belts are all two-way double belts, and are sequentially numbered as 621, 622, and 623. There are six machines arranged around the conveying line, which are sequentially numbered as 611, 612, 613, 614, 615 and 616. The conveying line can plan different conveying line paths according to different product types.

Figure 6:
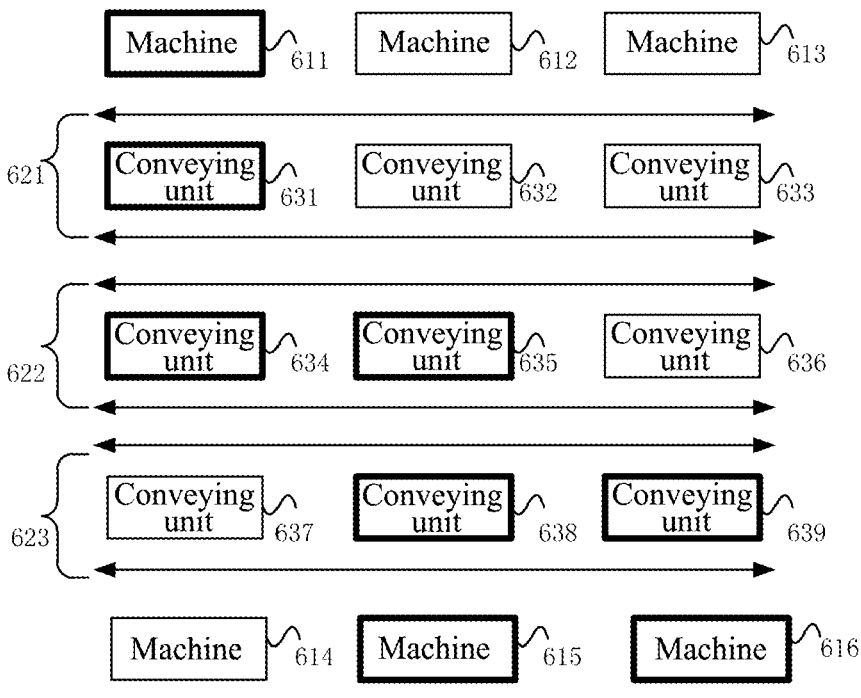
FIG. 6 is a schematic diagram of a conveying path of a conveying unit in a conveying line provided by an embodiment of the present application.

As shown in FIG. 6, a product A is processed. The left side of the conveying belt 622 is used as an entrance of the product A. A conveying demanding of the product A starts from the machine 611 and moves to the machine 616 via the machine 615. The upper computer determines that a conveying path of the product A is 634-631-634-635-638-639 according to the layout data of the nine conveying units and the conveying requirements of the product A.

The general controller generates a control instruction according to received conveying path data and received material location data, and controls the conveying units to move the material according to a preset path. Specifically, when the material location data received by the general controller indicates that the product A moves to the conveying unit 634, the general controller generates a control instruction to control a lifting device of the conveying unit 634 and a lifting device of the conveying unit 631 to raise at the same time, and start a translation motor of the conveying unit 634 and a translation motor of the conveying unit 631 to convey the product A from the conveying unit 634 to the conveying unit 631. When the material location data received by the general controller indicates that the product A has been conveyed to the conveying unit 631, the general controller generates a control instruction to control landings of the lifting device of the conveying unit 634 and the lifting device of the conveying unit 631, and stop the translation motor of the conveying unit 634 and the translation motor of the conveying unit 631.

The machine 611 starts to process the product A, and after the processing is completed, the conveying unit 631 re-conveys the product A to the conveying unit 634. When material location data received by the general controller indicates that the product A is re-conveyed to the conveying unit 634, the general controller generates a control instruction to control the product A to be re-conveyed to the conveying unit 635 via the conveying belt 622. When material location data received by the general controller indicates that the product A is located on the conveying unit 635, the general controller generates a control instruction to control a lifting device of the conveying unit 635 and a lifting device of the conveying unit 638 to raise at the same time, and start a translation motor of the conveying unit 635 and a translation motor of the conveying unit 638 to convey the product A from the conveying unit 635 to the conveying unit 638. When the material location data received by the general controller indicates that the product A has been re-conveyed to the conveying unit 638, the general controller generates a control instruction to control landings of the lifting device of the conveying unit 635 and the lifting device of the conveying unit 638, and stop the translation motor of the conveying unit 635 and the translation motor of the conveying unit 638. The machine 615 starts to process the product A, after the processing is completed, when material location data received by the general controller indicates that the product A is re-conveyed to the conveying unit 638, the general controller generates a control instruction to control the product A to be conveyed to the conveying unit 639 via the conveying belt 623, and the machine 616 completes the processing.

The upper computer stores conveying path data of multiple product categories, the general controller receives material type data sent by the unit controller, when the switching of materials conveyed on the conveying line is determined, the upper computer determines a currently conveyed material category, determines a conveying path data according to the material category, and sends the conveying path data to the general controller. The general controller generates a control instruction according to the conveying path data and the material location data, so that the unit controller controls the conveying unit to convey the material according to the preset path.

Figure 7:
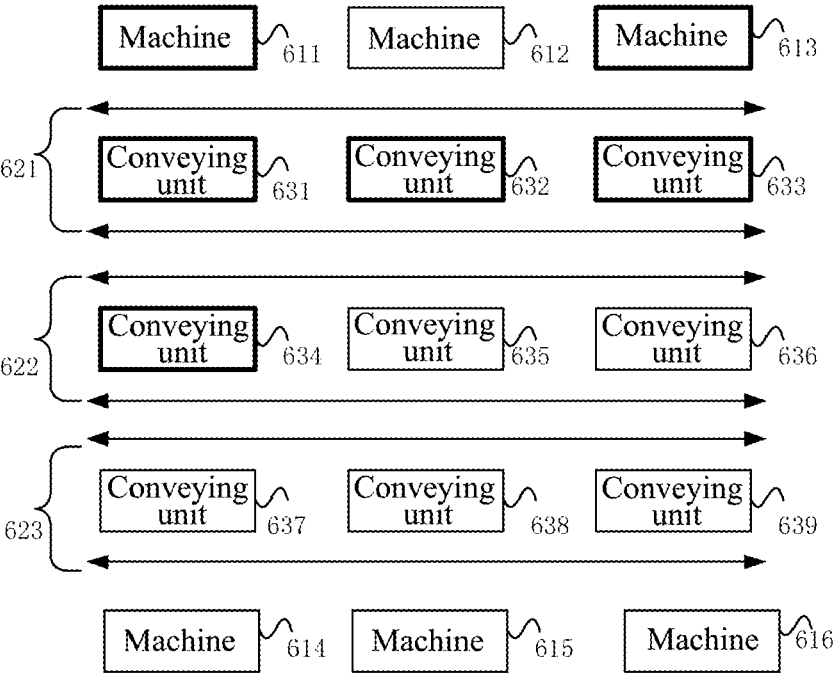
FIG. 7 is a schematic diagram of another conveying path of a conveying unit in a conveying line provided by an embodiment of the present application.

As shown in FIG. 7, a material conveying requirement of a product B is from machine 611 to machine 613, and a conveying path of a material generated by the upper computer according to the material conveying requirement and layout data of the conveying unit is 634-631-632-633. The conveying path of the product B is saved in the upper computer, when the sensor detects that the conveyed material is switched from a product A to the product B, the upper computer sends conveying path data of the product B to the general controller.

When material location data received by the general controller indicates that the product B enters the conveying line from the conveying unit 634, the general controller generates a control instruction to control a lifting device of the conveying unit 634 and a lifting device of the conveying unit 631 to rise at the same time, and start a translation motor of the conveying unit 634 and a translation motor of the conveying unit 631 to convey the product B from the conveying unit 634 to the conveying unit 631. When material location data received by the general controller indicates that the product B has been conveyed to the conveying unit 631, the general controller generates a control instruction to control landings of the lifting device of the conveying unit 631 and the lifting device of the conveying unit 634, and stop the translation motor of the conveying unit 631 and the translation motor of the conveying unit 634. The machine 611 starts to process the product B, after the processing is completed, the product B is sequentially conveyed to the conveying unit 632 and the conveying unit 633 through conveying belt 621, and then the machine 613 completes the processing.

Figure 8:
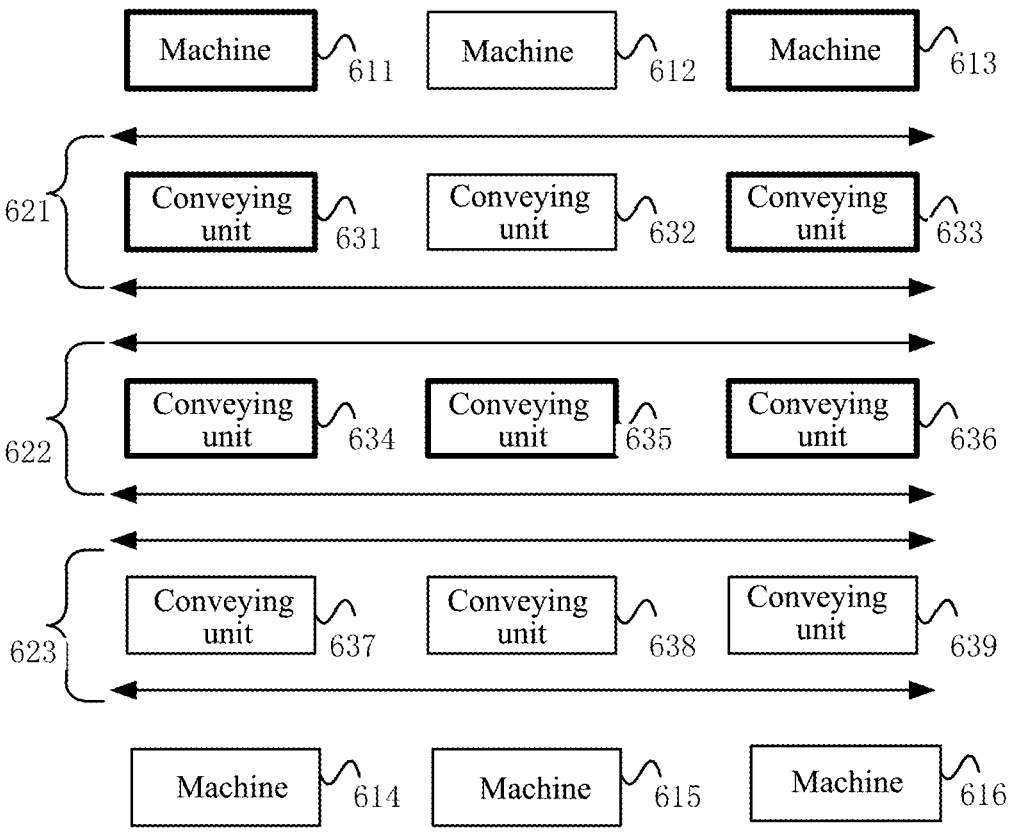
FIG. 8 is a schematic diagram of the yet another conveying path of a conveying unit in a conveying line provided by an embodiment of the present application.

As shown in FIG. 8, when it is determined that the machine 612 is processing a product, the product B can be bypassed the conveying unit 632, for example, the path is set to 634-631-634-635-636-633. The product B first enters the conveying line from the conveying unit 634, and is conveyed to the conveying unit 631. After the product B is processed by the machine 611, it is re-conveyed to the conveying unit 634, and then sequentially conveyed to the conveying unit 635 and the conveying unit 636 through the conveying belt 622. After the product B is conveyed to the conveying unit 636, the lifting device of the conveying unit 636 and the lifting device of the conveying unit 633 are raised at the same time, and the translation motor of the conveying unit 636 and the translation motor of the conveying unit 633 are started to convey the product B from the conveying unit 636 to the conveying unit 633; and after the product B is conveyed to the conveying unit 633, the lifting device of the conveying unit 636 and the lifting device of the conveying unit 633 are landed and the translation motor of the conveying unit 636 and the translation motor of the conveying unit 633 are stopped, and the machine 613 completes the processing of the product B.

The control system for the conveying line provided by the embodiment of the present application can realize flexible organization layout through several conveying units in cooperation with the conveying belt, and sends the conveying path data to the general controller through the upper computer. The general controller generates a control instruction based on the conveying path data and the material location data, so that the conveying unit can complete the corresponding functions, such as translation commutation, straight-line release, straight-line buffering, etc., to realize the dynamic adjustment of the conveying line function. The control system for this conveying line can realize the dynamic adjustment of the transmission path without moving the position of the conveying unit, and also without rewriting and downloading programs of the unit controller and the general controller.

Figure 9:
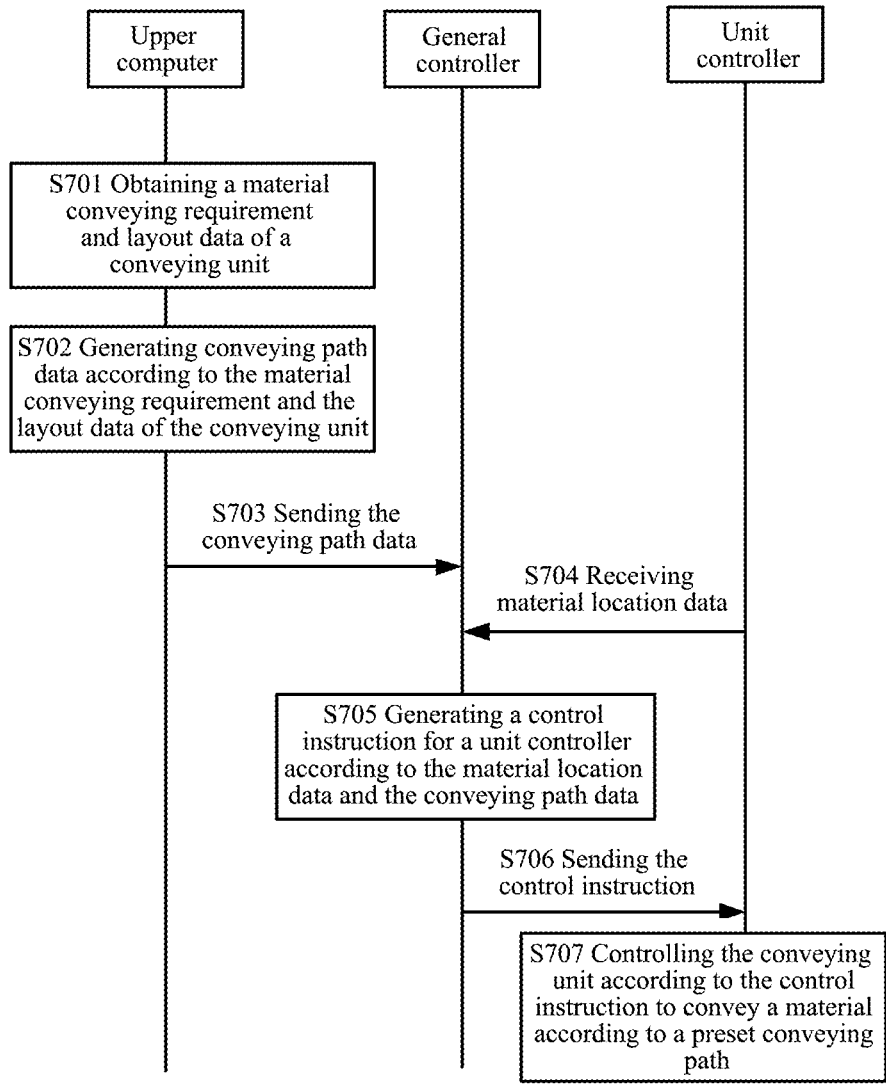
FIG. 9 is a schematic flow diagram of a control method for a conveying line provided by an embodiment of the present application.

As shown in FIG. 9, an embodiment of the present application provides a control method for a conveying line, and the method is applied to the above control system for the conveying line. The control method includes the following steps:

S701, an upper computer obtains a material conveying requirement and layout data of a conveying unit.

Among them, the material conveying requirement includes a starting station, a medium station and an end station of a material conveying. The layout data of the conveying unit includes the relative positional relationship between the conveying unit and the station.

S702, the upper computer generates conveying path data according to the material conveying requirement and the layout data of the conveying unit.

Among them, the upper computer generates the conveying path data according to the material conveying requirement and the layout data of the conveying unit. The conveying path data specifically includes the required conveying unit for completing the material conveying requirement and the work sequence between the conveying units.

S703, the upper computer sends the conveying path data to a general controller, and the general controller receives the conveying path data sent by the upper computer.

S704, a unit controller sends a material location data to the general controller, and the general controller receives the material location data sent by the unit controller.

Among them, the material location data includes the current location of the material, that is, the conveying unit where the material is currently located.

S705, the general controller generates a control instruction for the unit controller according to the material location data and the conveying path data.

Among them, the general controller determines the conveying unit where the material is currently located according to the material location data, then determines the conveying unit that the material will flow through according to the conveying path data, and generates a control instruction for controlling the current conveying unit and the conveying unit that will flow through.

S706, the general controller sends the control instruction to the unit controller.

S707, the unit controller controls the conveying unit according to the control instruction to convey a material according to a preset conveying path.

Among them, the unit controller parses the control instruction, determines, according to the result of the parsing, the action function which need to be completed by the current conveying unit and the conveying unit that will flow through, such as translation commutation, straight line release, straight line buffer, etc., and generates a control signal according to the action function that the conveying unit need to complete, so as to control the current conveying unit and the conveying unit that will flow through to complete the corresponding action function, and finally make the conveying unit convey the material according to the preset conveying path.

In the control method provided in this embodiment of the present application, the upper computer generates conveying path data according to the material conveying requirement and the layout data of the conveying unit, so that the general controller generates the control instruction according to the conveying path data and the material location data, and the unit controller controls the conveying unit to convey the material according to the preset conveying path, which can adapt to various conveying requirements of a material without rewriting and downloading programs for the general controller and the unit controller to adapt to the changing material conveying requirement, and without changing the layout of the conveying unit to adapt to the changing material conveying requirement, thereby realizing flexible conveying of a material.

In some embodiments, the control method further includes the following steps:

S801, the upper computer generates interface configuration information according to an electrical connection mode between the sensor and the unit controller and an electrical connection mode between the actuator and the unit controller.

Among them, multiple sensors are provided in the conveying unit, for example a sensor used to detect material location data, a sensor used to detect fault state of the actuator, and a sensor used to detect whether the conveying unit is occupied. The electrical connection between the sensor and the unit controller is used to determine whether each interface in the unit controller is connected to each sensor.

Correspondingly, multiple actuators are also provided in the conveying unit, and the electrical connection mode between the actuator and the unit controller is used to determine whether each interface in the unit controller is connected to each actuator. The upper computer generates interface configuration information according to the above electrical connection relationships to realize the configuration of each interface in the unit controller.

The unit controller includes an analog signal input interface circuit, a digital signal input interface circuit, an analog signal output interface circuit, and a digital signal output interface circuit.

If there is an electrical connection between the analog signal input interface circuit and the sensor, the upper computer generates interface configuration information used to configure the analog signal input interface circuit, to complete an interface configuration of the analog signal input interface circuit.

If there is an electrical connection between the digital signal input interface circuit and the sensor, the upper computer generates interface configuration information used to configure the digital signal input interface circuit, to complete an interface configuration of the digital signal input interface circuit.

If there is an electrical connection between the analog signal input interface circuit and the sensor and there is an electrical connection between the digital signal input interface circuit and the sensor, the upper computer generates interface configuration information used to configure the digital signal input interface circuit and the analog signal input interface circuit, to complete interface configurations of the digital signal input interface circuit and the analog signal input interface circuit.

If there is an electrical connection between the analog signal output interface circuit and the actuator, the upper computer generates interface configuration information used to configure the analog signal output interface circuit, to complete an interface configuration of the analog signal output interface circuit.

If there is an electrical connection between the digital signal output interface circuit and the actuator, the upper computer generates interface configuration information used to configure the digital signal output interface circuit, to complete an interface configuration of the digital signal output interface circuit.

If there is an electrical connection between the analog signal output interface circuit and the actuator and there is an electrical connection between the digital signal output interface circuit and the actuator, the upper computer generates interface configuration information used to configure the digital signal output interface circuit and the analog signal output interface circuit, to complete interface configurations of the digital signal output interface circuit and the analog signal output interface circuit.

S802, the upper computer sends the interface configuration information to the general controller.

S803, the general controller receives the interface configuration information sent by the upper computer, and generates interface configuration instruction, interface query instruction and interface control instruction according to the interface configuration information.

Among them, the interface configuration instruction is used to configure the interface parameter of the input port of the unit controller and the interface parameter of the output port of the unit controller, the interface query instruction is used to query the interface status information of the input port of the unit controller, and the interface control instruction is used to control the actuator connected with the output port of the unit controller.

In the control method provided by the embodiment of the present application, when it is necessary to add a sensor, add an actuator, modify an interface of the sensor or modify an interface of the actuator in the conveying unit, there is no need to modify a program in the unit controller, only the upper computer needs to generate the interface configuration information according to the electrical connection relationship between the unit controller and the sensor and/or the electrical connection relationship between the unit controller and the actuator, and update it to the general controller, to configure the interface between the unit controller and the sensor, as well as the interface between the unit control and the actuator.

In some embodiments, the control method further includes the following steps:

S901, the unit controller sends fault data of the conveying unit to the general controller.

Among them, a sensor located on the conveying unit monitors fault status of the conveying unit in real time, and reports fault data when a fault is detected in the conveying unit.

S902, the general controller sends the fault data of the conveying unit to the upper computer.

Among them, after receiving the fault data of the conveying unit sent by the unit controller, the general controller forwards the fault data to the upper computer, so that the upper computer updates the conveying path data according to the fault data.

S903, the upper computer updates the conveying path data according to the fault data.

Among them, after receiving the fault data, the upper computer determines the faulty conveying unit, updates the layout data of the conveying unit, and then re-plans a path according to the material conveying requirement and the updated layout data to generate new conveying path data, thereby achieving the update of the conveying path data.

In the control method provided by the embodiment of the present application, the material conveying path is updated according to the fault data, and the updated material conveying path bypasses the fault conveying unit, which can respond to the failure of the conveying unit and improve the reliability of the conveying line.

Finally, it should be noted that: the above embodiments are only used to illustrate the technical solution of the present application, rather than limiting it. Although the present application has been described in detail with reference to the foregoing embodiments, those skilled in the art should understand that: they can still modify the technical solutions recorded in the foregoing embodiments, or equivalently replace some or all of the technical features; and these modifications or replacements do not cause the essence of the corresponding technical solutions to deviate from the scope of the technical solutions of the embodiments of the present application.

What is claimed is:

1. A control system for a conveying line, wherein the conveying line comprises at least one conveying unit and each of the at least one conveying unit comprises a sensor and an actuator, and the control system comprises at least one unit controller, a general controller and an upper computer;

the unit controller one-to-one corresponds to the conveying unit, the unit controller is fixed in the corresponding conveying unit, the general controller is in communication with the unit controller, and the general controller is in communication with the upper computer;

the upper computer is configured to generate conveying path data according to a material conveying requirement and layout data of the conveying unit;

the general controller is configured to receive the conveying path data, and is further configured to receive material location data sent by the unit controller and generate a control instruction for the unit controller according to the material location data and the conveying path data; and the unit controller controls the conveying unit according to the control instruction to convey a material according to a preset conveying path;

wherein an input port of the unit controller is configured to electrically connect with the sensor, an output port of the unit controller is configured to electrically connect with the actuator; the upper computer generates interface configuration information according to an electrical connection mode between the sensor and the unit controller and an electrical connection mode between the actuator and the unit controller; and the general controller generates an interface configuration instruction, an interface query instruction and an interface control instruction according to the interface configuration information;

wherein the interface configuration instruction is configured to configure an interface parameter of the input port of the unit controller and an interface parameter of the output port of the unit controller, the interface query instruction is configured to query interface status information of the input port of the unit controller, and the interface control instruction is configured to control the actuator connected with the output port of the unit controller.

2. The control system according to claim 1, wherein the general controller and the upper computer are independent devices, or the general controller and the upper computer are integrated into one device.

3. The control system according to claim 1, wherein the unit controller comprises an analog signal input interface circuit and a digital signal input interface circuit;

if there is an electrical connection between the analog signal input interface circuit and the sensor, the upper computer generates interface configuration information for configuring the analog signal input interface circuit; or if there is an electrical connection between the digital signal input interface circuit and the sensor, the upper computer generates interface configuration information for configuring the digital signal input interface circuit; or if there is an electrical connection between the analog signal input interface circuit and the sensor and there is an electrical connection between the digital signal input interface circuit and the sensor, the upper computer generates interface configuration information for configuring the digital signal input interface circuit and the analog signal input interface circuit.

4. The control system according to claim 3, wherein the unit controller further comprises an analog signal output interface circuit and an digital signal output interface circuit;

if there is an electrical connection between the analog signal output interface circuit and the actuator, the upper computer generates interface configuration information for configuring the analog signal output interface circuit; or if there is an electrical connection between the digital signal output interface circuit and the actuator, the upper computer generates interface configuration information for configuring the digital signal output interface circuit; or if there is an electrical connection between the analog signal output interface circuit and the actuator and there is an electrical connection between the digital signal output interface circuit and the actuator, the upper computer generates interface configuration information for configuring the digital signal output interface circuit and the analog signal output interface circuit.

5. The control system according to claim 4, wherein the unit controller further comprises a unit processor and a unit communication circuit;

the unit communication circuit is configured to upload the material location data received by the analog signal input interface circuit and/or the digital signal input interface circuit to the general controller, and is further configured to receive the control instruction sent by the general controller; and the unit processor is configured to convert the control instruction into a control signal for controlling the actuator, and transmit the control signal to the actuator through the analog signal output interface circuit and/or the digital signal output interface circuit.

6. The control system according to claim 5, wherein the general controller comprises a general processor and a general communication circuit;

the general communication circuit is configured to receive the material location data sent by the unit communication circuit, and is further configured to receive the conveying path data sent by the upper computer; and the general processor is configured to generate the control instruction for the unit controller according to the material location data and the conveying path data.

7. The control system according to claim 1, wherein, the unit controller is configured to receive a fault data of the conveying unit and send the fault data to the general controller;

the general controller is configured to send the fault data to the upper computer; and the upper computer is configured to update the conveying path data according to the fault data.

8. A conveying line, comprising the control system according to claim 1 and at least one conveying unit, and the control system is configured to control the at least one conveying unit to convey a material according to a preset conveying path.

9. A control method for a conveying line, wherein the control method is applied to a general controller, the conveying line comprises at least one conveying unit and each of the at least one conveying unit comprises a sensor and an actuator, and the control method comprises:

receiving a conveying path data sent by an upper computer, wherein the conveying path data is generated according to a material conveying requirement and layout data of the conveying unit;

receiving material location data sent by a unit controller, wherein the unit controller one-to-one corresponds to the conveying unit, and the unit controller is fixed in the corresponding conveying unit;

generating a control instruction for the unit controller according to the material location data and the conveying path data; and sending the control instruction to the unit controller, so that the unit controller controls the conveying unit according to the control instruction to convey a material according to a preset conveying path;

wherein the control method further comprises:

receiving interface configuration information sent by the upper computer; wherein the interface configuration information is generated according to an electrical connection mode between the sensor and the unit controller and an electrical connection mode between the actuator and the unit controller; and generating an interface configuration instruction, an interface query instruction and an interface control instruction according to the interface configuration information; wherein the interface configuration instruction is configured to configure an interface parameter of an input port of the unit controller and an interface parameter of an output port of the unit controller, the interface query instruction is configured to query interface status information of the input port of the unit controller, and the interface control instruction is configured to control the actuator connected with the output port of the unit controller.

10. A control method for a conveying line, wherein the control method is applied to an upper computer, the conveying line comprises at least one conveying unit and each of the at least one conveying unit comprises a sensor and an actuator, and the control method comprises:

obtaining a material conveying requirement and layout data of the conveying unit;

generating conveying path data according to the material conveying requirement and the layout data of the conveying unit; and sending the conveying path data to a general controller;

wherein the conveying path data is configured to generate a control instruction for a unit controller, the control instruction is configured to control the conveying unit to convey a material according to a preset conveying path, wherein the unit controller one-to-one corresponds to the conveying unit, and the unit controller is fixed in the corresponding conveying unit;

wherein the control method further comprises:

generating interface configuration information according to an electrical connection mode between the sensor and the unit controller and an electrical connection mode between the actuator and the unit controller; and sending the interface configuration information to the general controller, so that the general controller generates an interface configuration instruction, an interface query instruction and an interface control instruction according to the interface configuration information.

11. The control method according to claim 10, wherein the unit controller comprises an analog signal input interface circuit and a digital signal input interface circuit;

the generating interface configuration information according to electrical connection mode between the sensor and the unit controller specifically comprises:

if there is an electrical connection between the analog signal input interface circuit and the sensor, generating interface configuration information for configuring the analog signal input interface circuit; or if there is an electrical connection between the digital signal input interface circuit and the sensor, generating interface configuration information for configuring the digital signal input interface circuit; or if there is an electrical connection between the analog signal input interface circuit and the sensor and there is an electrical connection between the digital signal input interface circuit and the sensor, generating interface configuration information for configuring the digital signal input interface circuit and the analog signal input interface circuit.

12. The control method according to claim 10, wherein the unit controller comprises an analog signal output interface circuit and a digital signal output interface circuit; the generating interface configuration information according to electrical connection mode between the actuator and the unit controller specifically comprises:

if there is an electrical connection between the analog signal output interface circuit and the actuator, generating interface configuration information for configuring the analog signal output interface circuit; or if there is an electrical connection between the digital signal output interface circuit and the actuator, generating interface configuration information for configuring the digital signal output interface circuit; or if there is an electrical connection between the analog signal output interface circuit and the actuator and there is an electrical connection between the digital signal output interface circuit and the actuator, generating interface configuration information for configuring the digital signal output interface circuit and the analog signal output interface circuit.

13. The control method according to claim 10, wherein the control method further comprises:

receiving fault data of a conveying unit sent by the general controller, wherein the fault data is collected by a sensor; and updating the conveying path data according to the fault data.

14. A control method for a conveying line, wherein the control method is applied to a unit controller, the conveying line comprises at least one conveying unit and each of the at least one conveying unit comprises a sensor and an actuator, the unit controller one-to-one corresponds to the conveying unit, the unit controller is fixed in the corresponding conveying unit, and the control method comprises:

sending material location data, so that a general controller generates a control instruction according to the material location data and conveying path data which is generated by an upper computer according to a material conveying requirement and layout data of the conveying unit; and controlling the conveying unit according to the control instruction to convey a material according to a preset conveying path;

wherein interface configuration information received by the general controller is generated according to an electrical connection mode between the sensor and the unit controller and an electrical connection mode between the actuator and the unit controller; an interface configuration instruction generated by a general controller is configured to configure an interface parameter of an input port of the unit controller and an interface parameter of an output port of the unit controller; an interface query instruction generated by the general controller is configured to query interface status information of the input port of the unit controller, and an interface control instruction generated by the general controller is configured to control the actuator connected with the output port of the unit controller.

15. The control method according to claim 14, wherein the general controller and the upper computer are independent devices, or the general controller and the upper computer are integrated into one device.

* * * * *